US010462698B2

(12) United States Patent
Ringland et al.

(10) Patent No.: US 10,462,698 B2
(45) Date of Patent: Oct. 29, 2019

(54) WLAN-LTE INTERFACE SELECTION

(71) Applicant: British Telecommunications Public Limited Company, London (GB)

(72) Inventors: Simon Ringland, London (GB); Francis Scahill, London (GB); Richard Evenden, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/562,229

(22) PCT Filed: Mar. 30, 2016

(86) PCT No.: PCT/EP2016/056958
§ 371 (c)(1),
(2) Date: Sep. 27, 2017

(87) PCT Pub. No.: WO2016/156430
PCT Pub. Date: Oct. 6, 2016

(65) Prior Publication Data
US 2018/0124630 A1 May 3, 2018

(30) Foreign Application Priority Data
Mar. 31, 2015 (EP) ...................... 15162022

(51) Int. Cl.
*H04W 8/18* (2009.01)
*H04W 8/26* (2009.01)
(Continued)

(52) U.S. Cl.
CPC ....... *H04W 28/0205* (2013.01); *H04W 8/183* (2013.01); *H04W 48/18* (2013.01);
(Continued)

(58) Field of Classification Search
CPC . H04W 28/0205; H04W 76/34; H04W 8/183; H04W 48/18; H04W 72/085
(Continued)

(56) References Cited

U.S. PATENT DOCUMENTS

| 2005/0147049 | A1* | 7/2005 | Ganesan | ............. H04M 1/2535 |
| | | | | 370/241 |
| 2007/0104218 | A1* | 5/2007 | Hassan | ................. H04L 1/0025 |
| | | | | 370/465 |

(Continued)

FOREIGN PATENT DOCUMENTS

| EP | 2709418 A2 | 3/2014 |
| WO | WO 2008/066928 A2 | 6/2008 |

(Continued)

OTHER PUBLICATIONS

U.S. Appl. No. 15/561,450, filed Sep. 25, 2017, Inventor(s): Ringland et al.

(Continued)

*Primary Examiner* — Christopher R Crompton
(74) *Attorney, Agent, or Firm* — Patterson Thuente Pedersen, P.A.; Amy Salmela

(57) ABSTRACT

A wireless router having a WiFi wireless network and including a small cell for routing LTE cellular data to a mobile network core is configured to monitor connected mobile devices and determine whether each mobile device should be connect to the hub using WiFi or LTE in accordance with the current utilization of the WiFi network and the current utilization of the LTE small cell. Since the small cell data traffic is encrypted in a data tunnel to the mobile network core, the network identity information of the device's WiFi interface and the device's LTE interface is determined by consulting an address mapping store in the cellular mobile network core.

7 Claims, 5 Drawing Sheets

(51) Int. Cl.
*H04W 28/02* (2009.01)
*H04W 48/18* (2009.01)
*H04W 72/08* (2009.01)
*H04W 76/34* (2018.01)

(52) U.S. Cl.
CPC ......... *H04W 72/085* (2013.01); *H04W 76/34* (2018.02); *H04W 8/26* (2013.01)

(58) Field of Classification Search
USPC ........................................................ 370/230
See application file for complete search history.

(56) References Cited

U.S. PATENT DOCUMENTS

| | | | |
|---|---|---|---|
| 2010/0118842 | A1 | 5/2010 | Kalhan |
| 2012/0188949 | A1 | 7/2012 | Salkintzis et al. |
| 2012/0226802 | A1 | 9/2012 | Wu et al. |
| 2013/0083661 | A1 | 4/2013 | Gupta et al. |
| 2013/0329714 | A1 | 12/2013 | Fan et al. |
| 2014/0241316 | A1 | 8/2014 | Okmyanskiy et al. |
| 2014/0293959 | A1 | 10/2014 | Singh et al. |
| 2014/0341023 | A1 | 11/2014 | Kim et al. |
| 2014/0369329 | A1 | 12/2014 | Lee et al. |
| 2016/0212755 | A1 | 7/2016 | Cao et al. |
| 2017/0134261 | A1 | 5/2017 | Seo et al. |
| 2018/0109998 | A1 | 4/2018 | Ringland et al. |

FOREIGN PATENT DOCUMENTS

| | | | | |
|---|---|---|---|---|
| WO | WO 2012/166671 | * | 12/2012 | ............ H04W 48/18 |
| WO | WO 2012/166671 A1 | | 12/2012 | |
| WO | WO 2013/006199 A1 | | 1/2013 | |
| WO | WO 2013/176588 A1 | | 11/2013 | |
| WO | WO 2016/156425 A1 | | 10/2016 | |
| WO | WO 2016/156439 A1 | | 10/2016 | |

OTHER PUBLICATIONS

U.S. Appl. No. 15/562,302, filed Sep. 27, 2017, Inventor(s): Scahill et al.
U.S. Appl. No. 15/562,847, filed Sep. 28, 2017, Inventor(s): Ringland et al.
International Preliminary Report on Patentability & Written Opinion, Application No. PCT/EP2016/056952, dated Oct. 3, 2017, 9 pages.
International Search Report, Application No. PCT/EP2016/056952, dated May 5, 2016, 4 pages.
"Small Cell Forum Ltd Integrated Fem to-WiFi (IFW) Networks", Feb. 28, 2012 (Feb. 28, 2012), XP055145624, 37 pages; Retrieved from the Internet: URL: http://www.smallcellforum.org/smallcellforum_resources/pdfsend01.php?file=Integrated-Femto-WiFi-Networks-WhitePaper_sm.pdf.
International Preliminary Report on Patentability & Written Opinion, Application No. PCT/EP2016/056970, dated Oct. 3, 2017, 14 pages.
International Search Report, Application No. PCT/EP2016/056970, dated Jun. 9, 2016; 4 pages.
International Preliminary Report on Patentability and Written Opinion, Application No. PCT/EP2016/056958, dated Oct. 3, 2017, 8 pages.
International Search Report, Application No. PCT/EP2016/056958, dated Jun. 1, 2016, 5 pages.
3rd Generation Partnership Project (3GPP TR 37.870 V0.5.0); Technical Specification Group Radio Access Network; Study on Multi-RAT joint coordination (Release 13). 650. Route Des Lucioles ; F-06921 Sophia-Antipolis Cedex ; France. Feb. 2015. pp. 1-22.
International Preliminary Report on Patentability & Written Opinion, Application No. PCT/EP2016/056967, dated Oct. 3, 2017, 9 pages.
International Search Report, Application No. PCT/EP2016/056967, dated Jun. 10, 2016, 5 pages.
Kobayashi, et al.; Internet Engineering Task Force (IETF); IP Flow Information Export (IPFIX) Mediation: Framework; ISSN: 2070-1721; Apr. 2011; 29 pages.
Raiciu, et al.; Internet Engineering Task Force (IETF); Coupled Congestion Control for Multipath Transport Protocols; ISSN: 2070-1721; Oct. 2011; 12 pages.
Ford, et al.; Internet Engineering Task Force (IETF); TCP Extensions for Multipath Operation with Multiple Addresses; ISSN: 2070-1721; Jan. 2013; 64 pages.
Simsek et al.; IEEE ICC 2013—Wireless Communications Symposium; "Rethinking Offload: How to Intelligently Combine WiFi and Small Cells?"; 978-1-4673-3122-7/13; pp. 5204-5208 (5 pages total).
Elsherif et al.; IEEE ICC 2013—Wireless Communications Symposium; "Adaptive Small Cell Access of Licensed and Unlicensed Bands" 978-1-4673-3122-7/13; pp. 6327-6332 (6 pages total).
Small Cell Forum; Release Four; Document 033.04.01 "Integrated Femto-WiFi (IFW) Networks"; Dec. 1, 2013; www.smallcellforum.org; 37 pages.

* cited by examiner

WLAN-LTE INTERFACE SELECTION

CROSS REFERENCE TO RELATED APPLICATIONS

The present application is a National Phase entry of PCT Application No. PCT/EP2016/056958, filed on 30 Mar. 2016, which claims priority to EP Patent Application No. 15162022.6, filed on 31 Mar. 2015, which are hereby fully incorporated herein by reference.

TECHNICAL FIELD

The present disclosure relates to data networks and in particular to a method and apparatus for selecting a network interface for use by a mobile device.

BACKGROUND

A typical broadband setup involves a router device with a Digital Subscriber Line (DSL) or cable link to an Internet Service Provider (ISP) connected to wide area networks such as the Internet and resources such as file/video/content servers and other correspondent nodes.

Typically, many mobile devices do not have wired interfaces such as Ethernet to connect to the router using a wired connection. To address this, and to provide flexible connectivity, the IEEE 802.11 family of standards relating to "Wi-Fi" is now a popular system for allowing computing devices to communicate wirelessly using radio wave transmission. Groups of computing devices all communicating via a common wireless access point are known as wireless local area networks (WLANs).

In such systems, when a mobile device is in communication with a correspondent node, application data is sent in IP data packets from a mobile device to the wireless access point via Wi-Fi, from the router to the ISP core network via xDSL and from the ISP core to wide area network protocols to reach the correspondent node.

Mobile/Cellular networks also provide data connectivity although typically over a wide area instead of local area in WLANs. Mobile Network Operators (MNOs) maintain Public Land Mobile Networks (PLMNs) formed of a number of radio base stations known as macrocells connected to a network core which provides control functions as well as connectivity to wide area networks such as the Internet. An example of a cellular network protocol is Long Term Evolution (LTE) sometimes known as 4G.

In order to supplement the coverage of macrocells, shorter range base stations such as picocells and femtocells, collectively known as small cells, are being deployed. In addition to the smaller geographical coverage, the small cells differ from macrocells in that they are connected to the mobile network core, an Evolved Packet Core (EPC) in LTE, using a broadband connection instead of dedicated cabling. This allows LTE small cells to be co-located or even integrated into a wireless access point router device.

In LTE small cells, when a mobile device is in communication with a correspondent node using a small cell instead of Wi-Fi, application data is sent in IP data packets from the mobile device to the small cell in the router via LTE, from the router to the ISP core network via xDSL, from the ISP core to a mobile network core, and from the mobile network core to a, or a number of, wide area networks to reach the correspondent node.

Today there are many mobile devices which combine both Wi-Fi and Cellular (LTE in particular) radios allowing the ability to connect to wide area network resources via both Wi-Fi and cellular protocols. Typically, the mobile devices are configured to only use one of the wireless technologies at any given time to save power. Therefore when both types of wireless network are available, a decision must be made over which connection to use in any given circumstance.

The general behavior is for the device to select Wi-Fi in preference to cellular whenever it is available. Whilst this is a simple decision, it can be inefficient as this behavior takes no account of the quality of connection available on each radio and also takes no account of the overall loading on each network.

SUMMARY

The present disclosure addresses the above problem.

The present disclosure accordingly provides, in a first aspect, a system for determining the identities of a mobile device connected to a local wireless network and a cellular data network, the system comprising: means for determining an identifier associated with a local wireless network adaptor of the mobile device; a data store containing mappings between: an identifier associated with a wireless network adapter of the mobile device; a identifier associated with the mobile device; and a subscriber identity of a subscriber module for accessing a cellular data network, means for retrieving the subscriber identity associated with the subscriber module of the mobile device; means for determining a base station within the cellular network currently connected to the subscriber module and if there is correspondence, storing the identifier associated with the wireless network adaptor, storing a current IP address of the wireless adaptor of the mobile device and storing cell identification information.

The present disclosure accordingly provides, in a second aspect, a method for determining the identities of a mobile device connected to a local wireless network and a cellular data network, the method comprising: determining an identifier associated with a local wireless network adaptor of the mobile device; accessing a data store containing mappings between: an identifier associated with a wireless network adapter of the mobile device; a identifier associated with the mobile device; and a subscriber identity of a subscriber module for accessing a cellular data network, retrieving the subscriber identity associated with the subscriber module of the mobile device; determining a base station within the cellular network currently connected to the subscriber module and if there is correspondence, storing the identifier associated with the wireless network adaptor, storing a current IP address of the wireless adaptor of the mobile device and storing cell identification information.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION

Figure 1:
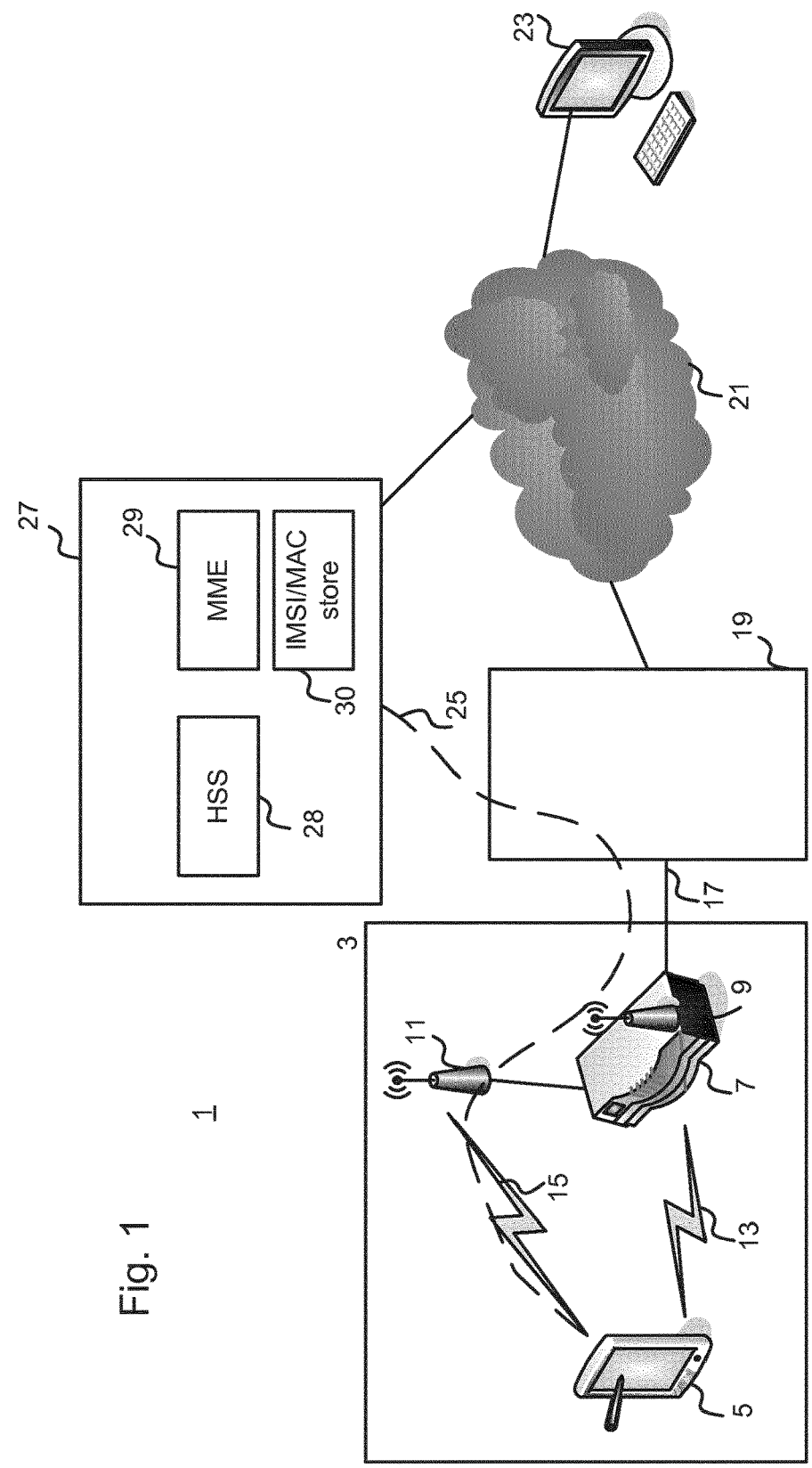
FIG. 1 schematically shows an example network architecture according to a first embodiment.

FIG. 1 provides an overview of a data network 1 in accordance with the first embodiment. Within a user premises 3 such as a home or office environment, a mobile device 5 such as a mobile phone, tablet or laptop is shown connected to a wireless access point and router device 7, hereinafter referred to as a hub 7.

The hub 7 contains a WiFi access point 9 which generates and maintains a wireless local area network (WLAN) in accordance with a WiFi protocol such as IEEE 802.11ac for a surrounding area, such as the user premises 3, to enable the mobile device 5 to connect and communicate with the hub 7 via the WLAN.

The hub 7 is connected to a standalone small cell 11 which provides LTE data connectivity to the user device 5 within a small zone around the hub 7. For ease of explanation, the range of the small cell 11 is assumed to be limited to the extent of the user premises 3.

The mobile device 5 therefore has data connections to the hub 7 and can create a data path to any correspondent node 23 via two types of wireless protocol, in this case a WiFi data link 13 which initially carries WiFi data packets 13 and cellular network data link 15 which starts with data packets transferred via LTE to the small cell 11 associated with the hub 7 and tunneled to the cellular network data core 27.

The hub 7 generally functions as a routing device for data transfer between any connected local devices 5 and also connects those devices 5 to resources on wide area networks such as the Internet 21. The hub contains a wide area network interface, in this embodiment, an xDSL modem for communication over a copper and/or optical fiber link 17 to an ISP core network 19 which itself provides links to wide area network 21 resources such as the Internet and correspondent nodes 23 such as video servers, file servers and other users, etc.

The ISP core 19 contains the termination points for the copper/fiber link 17 and functionality to connect the hub 7 data sessions to resources available on wide area networks such as the Internet 21. Billing and user authentication is also handled by the ISP core 19.

Although the WiFi link 13 and LTE link 15 are both wireless links from the mobile device 5 which traverse the hub 7, the onward processing of data packets within those links is handled differently.

For WiFi, the packets are forwarded to the ISP core 19 which is responsible for forwarding the data to a packet destination, such as the correspondent node 23 via the Internet 21.

In contrast, the small cell 11 has similar functionality to a short range cellular network macrocell and therefore a mobile device 5 will link to the small cell 11 in accordance with standard LTE handover and idle mode reselection procedures. The small cell 11 maintains a data tunnel 25, for example using Generic Routing Encapsulation (GRE) and IPSec, to a cellular network core 27. Data packets from the mobile device 5 travel via the LTE link 15 to the small cell 11 and then through the tunnel 25 via the hub 7 and the ISP core 19 to the cellular network core 27 which is responsible for routing data to the Internet 21 and correspondent node 23. Since the small cell 11 is a standalone device, the contents of LTE data flow are encrypted and sent along the tunnel 25 so the hub 7 has no visibility of addressing information.

As is conventional, the network core 27 contains a Home Subscriber Server (HSS) 28 and a Mobility Management Entity (MME) 29. As will be explained in more detail later, the cellular network core 27 further includes an IMSI-MAC store 30.

As a result, there are two logically separate data paths between the mobile device 5 and the correspondent node 23 and data packets in the paths will both travel from the mobile device 5 through the hub 7 and the network core 19 but then take different paths on the way to the correspondent node 19.

A conventional mobile device 5 will only use one interface at a time, i.e. only the WiFi link 13 or only the LTE link 15. Furthermore, the standard behavior is that if WiFi functionality is enabled on the mobile device 5 and a working WiFi network connection is available, then the mobile device 5 will use the WiFi link 13 in preference to the LTE link 15. The LTE function is usually disabled on the mobile device to save power.

Overview of the Processing of an Embodiment

In summary, the processing in the first embodiment relates to a hub 7 configured to control which wireless protocol interface a mobile device 5 uses to connect to external network 21 resources. Unlike the conventional situation where a mobile device 5 itself or the user of the device decides which interface to use, the hub 7 determines which interface should be used based on the network utilization of each interface by other devices connected to the same local network. Furthermore methods are described for determining the network identifiers of a device on WiFi and LTE so that data sessions can be redirected.

The steering procedure can be carried out at any time rather than just at the initial connection. For example, the hub 7 can re-evaluate the connections every few minutes. In another case, any time a new device 5 tries to connect to the hub 5, the connections for all devices 5 are re-evaluated.

Description of the Components

In the first embodiment, the connection selection and steering functionality of the hub 7 relies on interaction between an application installed on the mobile device 5 and interaction with the management functions of the cellular network core 27. Therefore the structure and components of the hub 7 and mobile device 5 will be described briefly before a discussion of the interaction between the functional components of the small cell 5 and hub 7.

Figure 2:
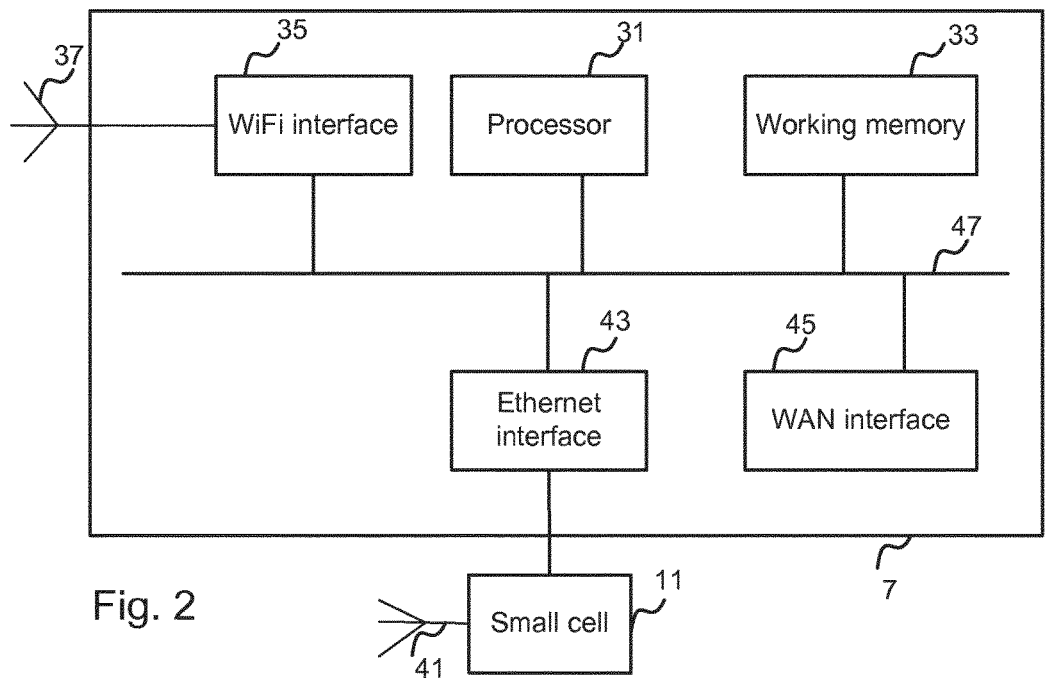
FIG. 2 schematically shows the physical components of a hub device for managing data connections to local devices.

FIG. 2 shows the physical components of a hub 7 device according to the first embodiment. As shown the hub 7 has a central processor 31 for controlling the overall operation of the hub 7 in accordance with processing instructions stored in a memory store 33 which is a combination of Random Access Memory (RAM) and also Read Only Memory (ROM).

For connectivity with external devices, the hub 7 also includes wireless and wired network interfaces. A WiFi controller 35 and a WiFi antenna 37 provides wireless local area network (WLAN) connectivity and in this embodiment, the standalone small cell base station 11 and a LTE antenna 41 are attached to an Ethernet interface 43 of the hub 7 for providing cellular network access. The hub 7 also includes a wide area network controller 45, in this embodiment, a Very High bit-rate Digital Subscriber Line (VDSL) modem which provides connectivity to wide area networks such as the Internet 21 and ISP core 19 services over a copper twisted pair and fiber line. The components are all interconnected via an internal data bus 47.

When computer instructions stored in the working memory 33 are executed by the processor 31, the hub 7 can be regarded as a number of functional units involving a combination of hardware and software processing.

Figure 3:
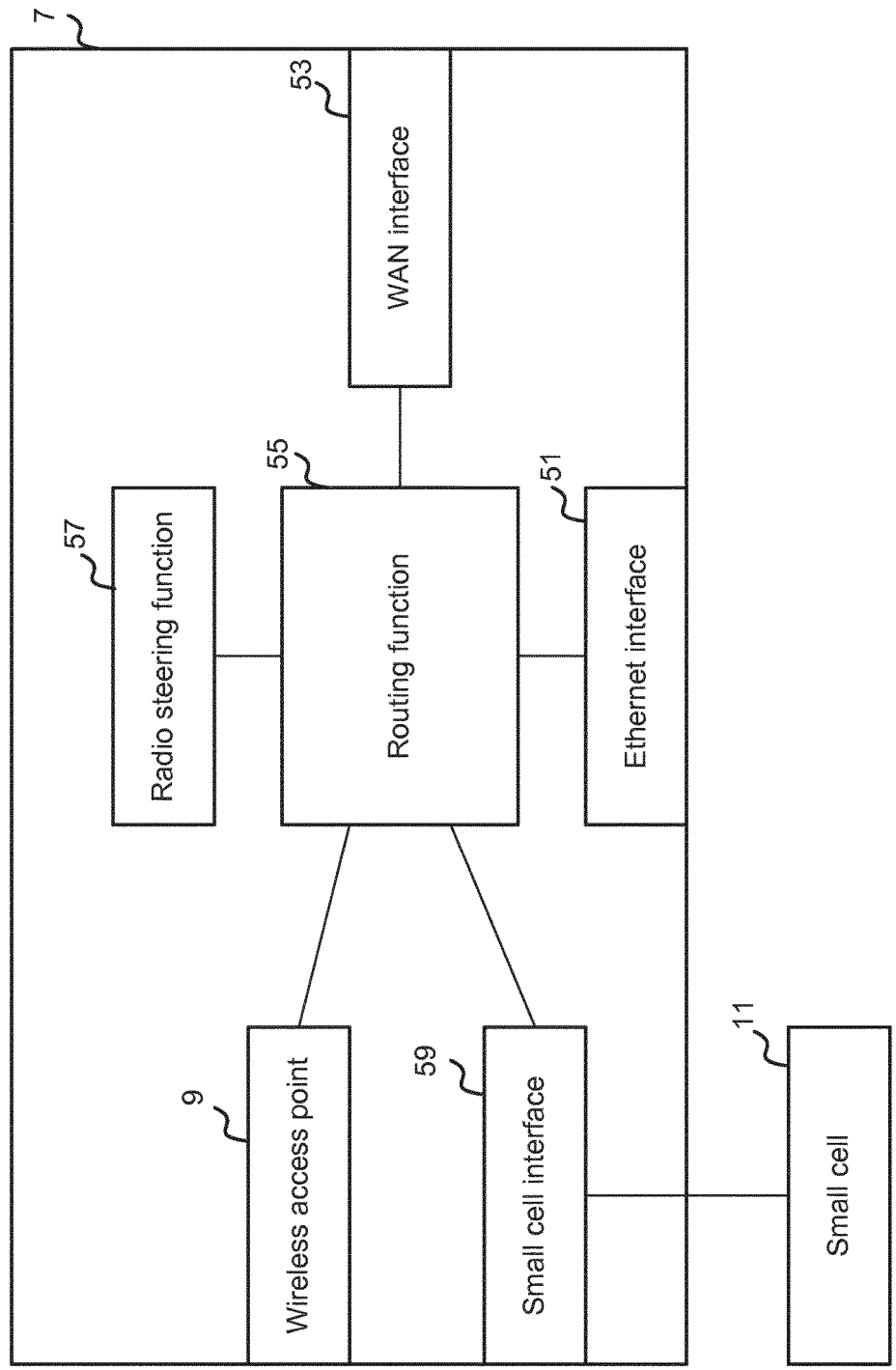
FIG. 3 schematically shows the functional components of the hub device in FIG. 2 in accordance with the first embodiment.

FIG. 3 shows the functional units of the hub 7 when the processor executable instructions stored in the working memory 33 are being executed by the processor 31 and the physical components are configured in accordance with the first embodiment.

The hub 7 includes a WiFi access point 9 function for sending and receiving data packets from WLAN devices using 802.11ac data protocol. For wired communication, the hub 7 also includes a wired interface 51 for communication with any local wired devices (not shown) and the hub also has WAN interface 53 for wired communication with external networks.

Although as shown in FIG. 2, the small cell 11 connects to the wired interface 51, for ease of explanation, the small cell 11 is shown connected to a separate functional interface, small cell interface 59.

To connect and coordinate the flow of data packets between the various local network wireless and wired interfaces 9, 51, the small cell interface 59 and the WAN interface 53, the hub 7 includes a packet routing function 55 which is responsible for inspecting the header information of each incoming packet from any of the interfaces, determining the destination of the packet and forwarding each packet to the appropriate network interface 9, 51, 53, 59 for delivery to the destination.

In accordance with the first embodiment, the hub 7 includes processing to decide whether a connected device 5 should use the WiFi access point 9 or the standalone small cell 11 for data communications via the WiFi path 13 or the LTE path 15 with correspondent nodes 19. The decision is based on a number of factors, including the current status of the hub 7 such as whether any other devices (not shown) are transmitting/receiving data which affects the available data capacity available.

Another factor is whether the device 5 is connected to both the WiFi access point 9 and the cellular access point 11 at a given point in time.

Therefore the hub 7 also includes a radio steering function 57 for determining which interface should be used.

Figure 4:
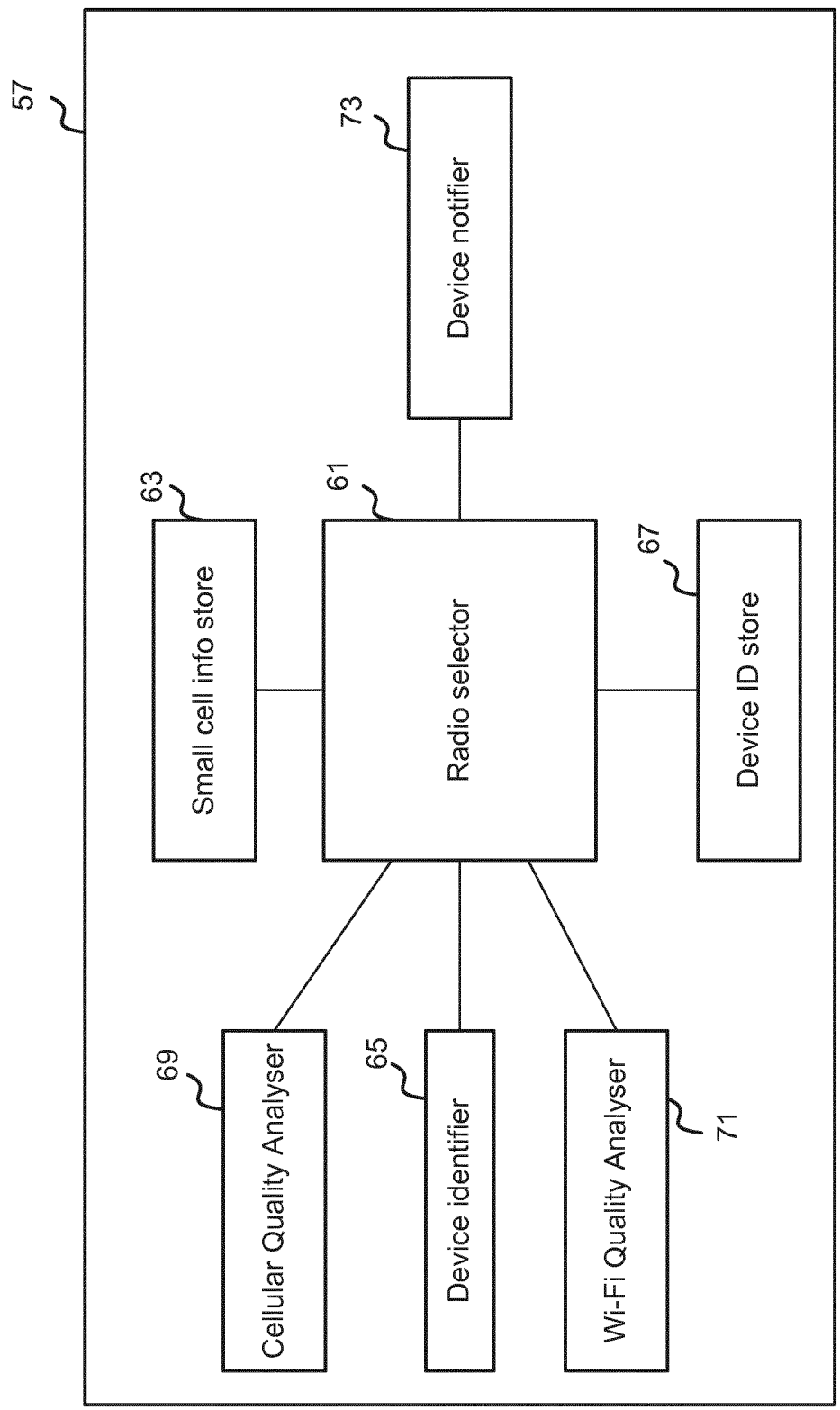
FIG. 4 schematically shows the functional components of a radio steering function of the hub.

FIG. 4 shows the radio steering function 57 in more detail. The main component of the radio steering function 57 is a radio selector 61 that is connected to a number of inputs and data stores. The data stores include a small cell information store 63, a device information identifier 65, a device identity store 67, a cellular network quality analyzer 69, a WiFi network quality analyzer 71 and a device notifier 73.

In this embodiment, the radio steering function 57 relies on communication with functions in the mobile device 5, therefore the components of the mobile device will now be described before explaining the interaction of the radio steering function 57 and functional components of the mobile device 5.

Figure 5:
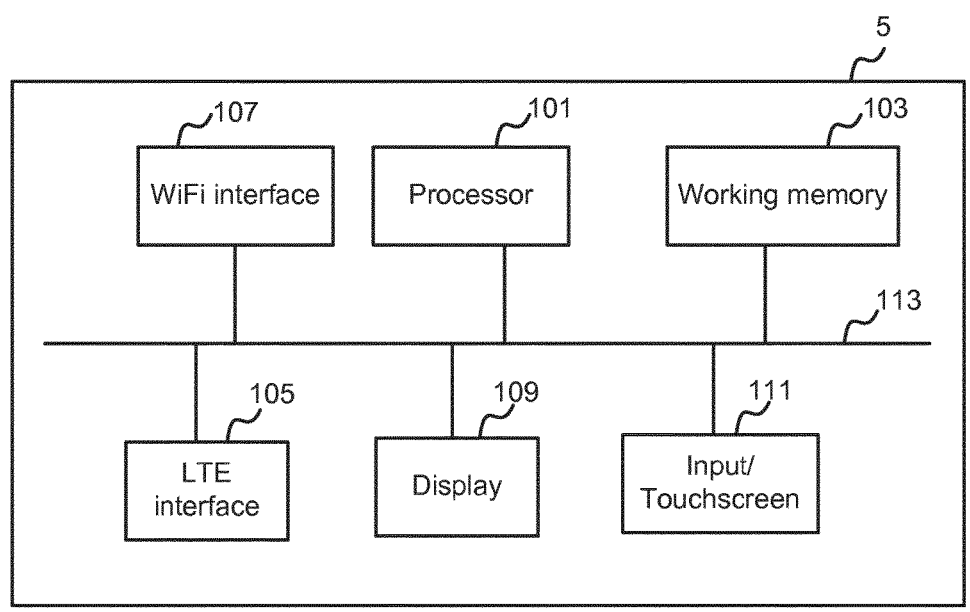
FIG. 5 schematically shows the physical components of a mobile device.

FIG. 5 shows the main functional components of a mobile device in accordance with the first embodiment. The mobile device includes a processor 101, a working memory 103 having both Random Access Memory (RAM) and Read Only Memory (ROM), a cellular network interface 105, a WiFi network interface 107, a display 109 and input device 111 such as a touch screen. The internal components are connected via common data bus 113.

When processor implementable instructions stored on the working memory 103 are executed by the processor 101, the mobile device 5 can be regarded as a number of functional components.

Figure 6:
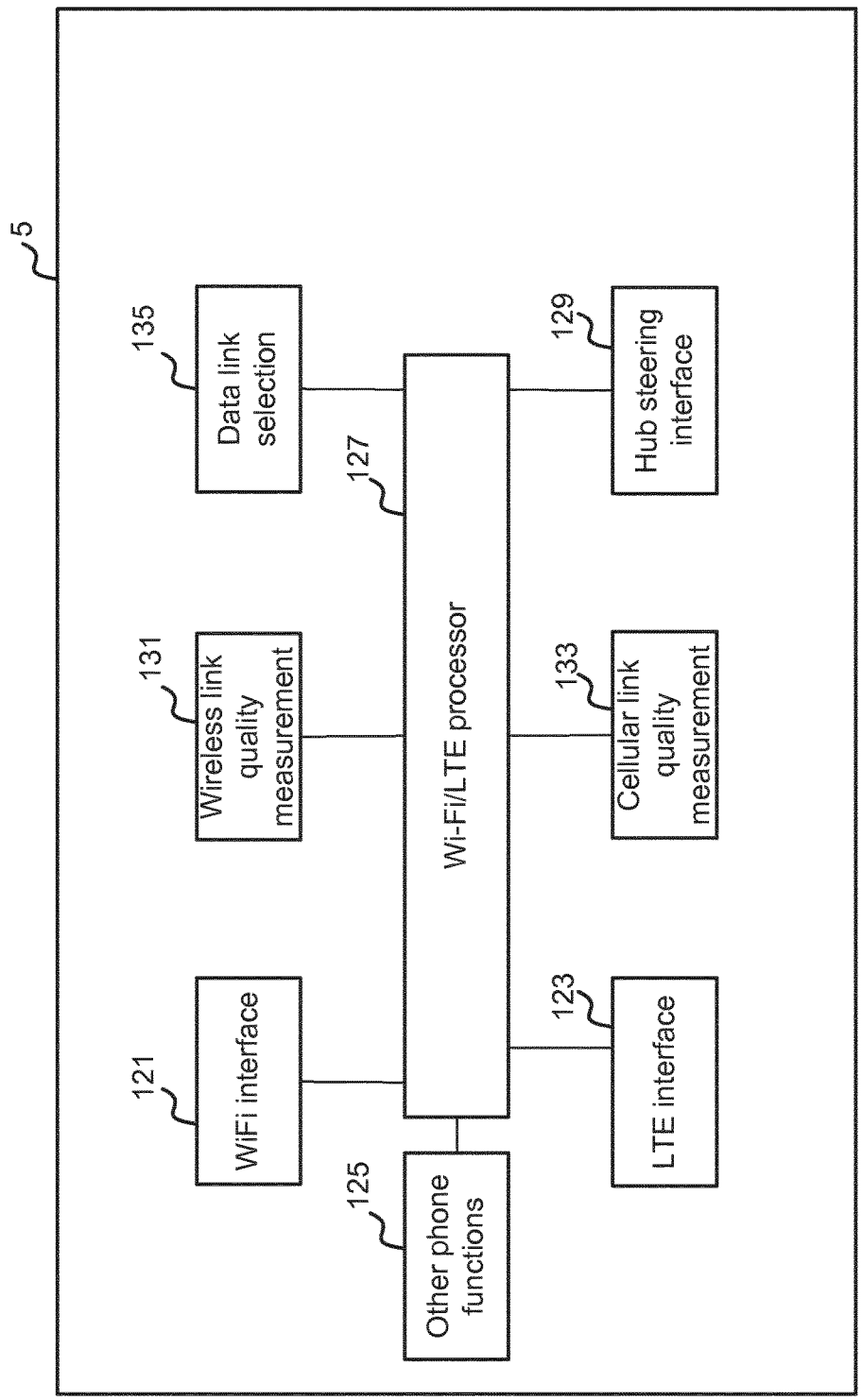
FIG. 6 schematically shows the functional components of the mobile device.

FIG. 6 shows the functional components of the mobile device 5. The mobile device 5 has a LTE interface 121, a WiFi interface 123 and standard mobile device functionality 125 such as phone, data and display functions which are present but do not form part of the present disclosure and will not be described.

In this embodiment, the mobile device 5 contains an application which performs functions to aid the hub 7 in steering the device between a WiFi and LTE data connection, when the application code is executed by the processor 101, the mobile device 5 is configured to also include a WiFi/LTE processor 127, a hub steering interface 129, a wireless link quality measurement function 131, a cellular link quality measurement function 133, and a data link selection store 135.

The LTE interface 121 and WiFi interface 123 include the controller software and hardware for LTE and WiFi data communication respectively.

Now that the components of the mobile device 5 have also been introduced, for ease of explanation, the steering processing of the hub 7 in the first embodiment will be explained in relation to a single mobile device 5 connecting to the hub 7. In practice the hub 7 is operable to provide steering functionality to multiple devices 5.

Returning to FIG. 4 showing the hub 7, the small cell information store 63 contains information about the LTE small cell 11 connected to the hub 7 which in this embodiment is a standalone small cell 11 of into the hub 7. In particular it contains LTE operational parameters including the MNC, MCC, tracking area identifier (TAI) and cell ID of the integrated small cell. The small cell information store 63 is also configured with information indicating whether the small cell supports local breakout services. The parameters are obtained from the ISP core 27 using a remote hub management protocol such as TR-069 when the hub 7 is initialized.

As part of the initialization an IMSI-MAC store 30 in the cellular network core 27 is also created to maintain mappings between a connecting mobile device's International Mobile Subscriber Identity (IMSI), International Mobile Station Equipment Identity (IMEI) and a MAC address of the wireless access point 9.

Example contents of the IMSI-MAC store 30 are set out below.

| MAC | IMSI |
| --- | --- |
| 5C-F8-A1-11-22-3C | 0234151122334455 |
| 5C-F8-A1-FF-10-24 | 0234151231231234 |
| 5C-F8-A1-06-9E-17 | 0234154445556667 |
| 5C-F8-A1-07-2B-15 | 0234159876543210 |

Device Identity Information

As an initialization process, the WiFi/LTE processor 127 of the mobile device 5 is arranged to instruct the LTE interface 123 to identify the device information on the device. In this embodiment, the LTE interface 123 obtains the IMSI using functions such as Android TelephonyManager.getSubscriberId( ), the IMEI using TelephonyManager- .getDeviceId function and Wi-Fi MAC address using Wifi-Info.getMacAddress( ). The identity information is sent to the IMSI-MAC store 30.

The device information identifier 65 is responsible for obtaining addressing information and other data relating to the mobile device. The device information identifier 65 interacts with the hub steering interface 129 of the mobile device 5 and provides the radio selector 61 with notifications and information when the mobile device 5 connects to the hub 7.

The device identifier 65 is also configured to operate with components of the mobile network core 27 such as the Home Subscriber Server (HSS) 28) and the MAC-IMSI store 30.

When the mobile device 5 connects via Wi-Fi, the local IP address assigned to the device 5 along with a device name is received by the device information identifier 65 and stored in the device ID store 67 as a mapping between the mobile device's Wi-Fi MAC address and the mobile device's IP address in an Address Resolution Protocol table.

Since the mobile device 5 also has LTE connectivity, it will also have a different set of network addresses when connected to the cellular network core 27 but this information is not directly available to the radio steering function 57. Therefore the hub steering interface 129 of the mobile device 5 is arranged to notify the hub 7 with these parameters.

When the mobile device attaches to the hub 7 via Wi-Fi, the hub 7 records the mapping between the mobile device's 5 Wi-Fi MAC address and the current IP address in its ARP table.

The device identifier 65 of the hub 7 is operable in this embodiment to make a request to the IMSI-MAC store 30 in the cellular network core 27. The request includes the connecting mobile device's 5 MAC address and the IMSI-MAC store 30 is arranged to return the IMSI & IMEI associated with that MAC address.

The device identifier 65 then communicates with an HSS 28 inside the cellular network core 27, to request which MME 29 is associated with the retrieved IMSI and also registers to be informed if the device's 5 attached Cell-ID changes.

The device identifier 65 then makes a request to the located MME 29 for the tracking area identifier (TAI) and Cell ID (ECGI or ECI) of the cell to which the device is attached.

Once the MME 29 responds, the device identifier 65 stores this information in the hub's Device ID Store 67.

If at some later time the device 5 leaves the cell it is currently attached to, the MME 29 will then send a message to the hub 7 informing it that the device 5 has moved and the identity of the new MME (not shown) handling the device 5, if that has changed. (The hub 7 can then register for updates on this device from the new MME.)

An example of the contents of the Device ID store 67 is set out below.

| Wi-Fi PHY Layer Identifier | IP address on Wi-Fi | TAI/ECI | Connected to this hub |
|---|---|---|---|
| MAC: 5C-F8-A1-11-22-3C | 192.168.1.71 | 23415123/1213 | true |
| MAC: 5C-F8-A1-FF-10-24 | 192.168.1.72 | 23415123/1213 | true |
| MAC: 5C-F8-A1-06-9E-17 | 192.168.1.73 | 234104567/222 | false |

Link Quality

Having populated the Device ID store 67 with address information of the WiFi and LTE address information of the mobile device 5, the radio steering function 57 gathers link quality information for use in deciding which link (WiFi or LTE) should be used by the mobile device 5.

Wi-Fi Connection Quality

A number of parameters are measured periodically by the Wi-Fi Quality Analyzer 71 in the hub 7 regarding overall Wi-Fi channel load and the specific information about the Wi-Fi connection of the particular mobile device in question, using API calls on the drivers for the Wi-Fi interface. Parameters for overall link status include:
 (i) Channel Utilization (same parameter as is broadcast in BSS Load element of 802.11 beacon);
 (ii) Channel noise level Meanwhile for the device 5 specifics, measured parameters include:
 1. Signal strength;
 2. link physical rate (for data or control/management packets);
 3. Downlink physical rate (for data or control/management packets);
 4. RX Bytes (number of received bytes from the mobile device);
 5. RX Packets;
 6. TX Bytes;
 7. TX Packets; and
 8. TX Retries From the collected parameters, further metrics are calculated by the Wi-Fi quality analyzer 71 including:
 Uplink and downlink average data rates are calculated based on the differences between consecutive TX/RX bytes figures (with smoothing over time).
 Percentage packet error rates are calculated as $100\times(\text{TX Retries}_{n+1}-\text{TX Retries}_n)/(\text{TX Packets}_{n+1}-\text{TX Packets}_n)$ with smoothing over time
 Individual device channel utilization is estimated by combining info on packets/bytes send and received with info on the physical rates used.

Furthermore in this embodiment, the wireless link quality measurement function 131 of the mobile device 5 is configured to perform similar active speed tests to a predefined URL provided by the WiFi quality analyzer 71 on the hub 7 and provide a device-side view of the connection quality using similar parameters to those measured by the hub 7. The wireless link quality measurement function 127 forwards the results to the Wi-Fi Quality Analyzer 71 of the hub 7 to improve the connection quality estimate.

A Wi-Fi connection quality figure is derived by the Wi-Fi Quality Analyzer 71 from the above data and compared against a predefined poor connection threshold, e.g. a points score for each individual measure specified in a predefined table, and added up across all the measures. If total score is below threshold, the connection is considered poor.

Alternatively a number of separate measures are calculated and individually compared to a set of predefined poor connection performance thresholds, e.g. signal strength <−85 dBm; retry rate >50% and physical rate <5 Mbps. If any measure fails, or a subset of thresholds fail, the connection is considered poor.

The processing of the WiFi quality analyzer 71 is carried out even if the mobile device 5 is no-longer connected to Wi-Fi, e.g. if it has been disassociated because of poor connection quality. The Wi-Fi Quality Analyzer 71 of the hub 7 will continue to monitor the device's Wi-Fi probe requests in order to detect improvements in signal strength, which will be a means of determining whether to steer the device back to Wi-Fi.

On the other hand, if the device is still associated to Wi-Fi but user traffic is being routed over the small cell 11 due to a poor Wi-Fi connection quality decision, then statistics for Wi-Fi management and control packets (including null data packets) are monitored to determine when the connection is no-longer considered poor.

Cellular Connection Quality

In this embodiment, the cellular quality analyzer 69 relies on interaction with the cellular link quality measurement function 133 of the mobile device 5 to provide it with LTE information regarding the cellular link quality for analysis.

In this embodiment, a number of parameters are periodically measured by the cellular link quality measurement function 133 on the mobile device, and passed to the cellular quality analyzer 69 over an http connection over the wireless access point 9. For resilience the data can also be sent to a network server (not shown) within the ISP core 19 and retrieved by the cellular quality analyzer 69 if the Wi-Fi connection is down.

In this embodiment, the following information is gathered by the cellular link quality measurement function 125 and sent to the cellular quality analyzer 69:

Connected cell id

Speed test—a http speed test to an internet based server

LTE signal strength and quality parameters of the device's cellular connection: RSRP and RSRQ (Reference Signal Received Power and Reference Signal Received Quality)

Traffic Steering Decision

The radio selector 61 is responsible for selecting the data link type that should be used by the mobile device using the device ID information, Wi-Fi link quality and cellular link quality parameters. The radio selector 61 compares the quality of the available connections and, based on a predefined policy and rules, makes a decision over which connection to select, taking into account not only information from the individual device, but all the information gathered about the each connected device and the overall conditions, including loading, on each radio interface.

In general, the WiFi connection is considered to be the default preferred link unless the LTE link is determined to be significantly better. For example the decision policy could be:

```
Choose LTE if:
(
    LTE Cell ID is a member of the set of BT Cell IDs
)
AND
(
    (
        The LTE speed test result > 1.5* WiFi Speed Test Result
    AND
        the LTE RSRP > -100dBm
    )
    OR
    (
        WiFi RSSI < -85 dBm
    )
)
AND
(
    WiFi RSSI < -55 dBm
)
AND
(
    Total load on LTE Cell <70%
)
ELSE
    choose Wi-Fi
```

In the first embodiment, the radio selector 61 is configured to determine the preferable radio link on device connection, but also periodically, such as every 5 minutes, to account for variations in link quality and stability.

Traffic Steering Implementation

Once the radio selector 61 has determined a link for use, the device notifier 73 is responsible for informing the mobile device 5 of the decision so that action can be taken by the mobile device 5.

In this embodiment, the device notifier 73 uses two different methods, using hub signaling or communicating via the hub steering interface 131 of the mobile device 5.

In the first method, the device notifier 73 uses a mobile device's standard bias to use WiFi whenever possible in preference to cellular data.

If the decision is to use LTE:

The device notifier 73 sends the hub steering interface 129 of the mobile device 5 a message of the decision to use WiFi and the result is stored in the data link selection store 135. Furthermore, the device notifier 73 issues a WiFi BSS Transition Management Frame to the mobile device 5 requesting the device to disassociate from WiFi, with an empty candidate list of alternative Wi-Fi APs. The device notifier 73 also configures the wireless access point 9 of the hub 7 to reject subsequent association attempts by the mobile device 5 until the radio selector 61 decides that Wi-Fi has become the preferred link.

For Passpoint R2 enabled mobile devices, an alternative is to send the device a Deauth frame, specifying a minimum time before the device retries.

If the decision is to use Wi-Fi:

The device notifier 73 sends the decision to the data link selection store 135 configures the Wifi interface 121 to Accept (or stop rejecting) association requests from the mobile device 5 when it next attempts to connect.

Using an Application to Implement Traffic Steering Decision

In a second mode of operation, the device notifier 73 sends a message to the WiFi/LTE processor 127 of the mobile device 5 via the hub steering interface 131, indicating the chosen radio access.

If the decision is to use LTE:

In response to an instruction to use LTE, the WiFi/LTE processor 127 causes the WiFi interface 121 to disconnect the Wi-Fi connection, or modifies a routing table in the data link selection store 135 so that the mobile device 5 routes data from applications over the LTE interface 123.

If the decision is to use Wi-Fi:

In response to an instruction to use WiFi, the WiFi/LTE processor 127 forces the WiFi interface to reconnect to Wi-Fi (if it is currently disconnected) and/or adjusts the routing table to route all (or selected) traffic over Wi-Fi.

The WiFi/LTe processor 127 can also be configured with a routing policy enabling selective routing of traffic flows over cellular and over Wi-Fi.

In accordance with the processing of the first embodiment, a hub 7 directs any connected devices to use either WiFi or LTE for data connectivity so that no changes are required to the functioning of the mobile devices beyond installation of an application to communicate information to the hub. Furthermore the radio selection is managed by the hub 7 having a Wi-Fi access point and a standalone small cell which has access to more detailed information about the performance of the various data links upon which to base a selection decision rather than just information about an individual device's connection. Therefore a better decision, optimized across all connected devices can be determined, rather than a poor decision made on limited information concerning a single device's connectivity.

Alternatives and Modifications

In the embodiment, the WiFi/LTE processor 127 running as an application on the phone is used to provide MAC to IMSI mappings to the hub 7.

In an alternative, the hub 7 is configured to operate a private network as well as a public hotspot network. The radio selector 61 and device notifier 73 of the hub 7 is configured to interact with a user of the mobile device 5. The user is first requested to make the mobile device WiFi interface 121, forget the "private" Wi-Fi SSID of the hub 7.

The WiFi interface 121 of the device 5 will then attempt to connect to the public SSID on the hub 7, using EAP-SIM authentication. This authentication contains both a subscriber identifier on the mobile network and the Wi-Fi MAC address of the device. The Device Identifier 65 within the Radio Steering Function 57 notes the device's Wi-Fi MAC address and IMSI by inspecting the Radius authentication messages and store the mapping in the IMSI-MAC Store 30.

The user is then requested to reconfigure the credentials for the hub's "private" Wi-Fi SSID on the mobile device 5.

In a further alternative, The Device bootstraps its connection to an Open Mobile Alliance Device Management (OMA-DM) server with an identification of IMSI. OMA-DM server makes a request for DevDetail MO, which has the option for an "Ext" extension into which Wi-Fi MAC address. The OMA-DM server then stores the IMSI/MAC address mapping in the IMSI-MAC store.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for selecting a data communication interface to be used by a mobile device having at least a wireless local area network interface connected to a wireless local area data network and a cellular network interface connected to a cellular data network, the method being performed by a wireless access point device configured to send and to receive data packets to and from the wireless local area network interface and the cellular network interface of the mobile device and for communicating the data packets on to a plurality of wide area networks, the method comprising:

determining an identifier associated with a local wireless network adaptor of the mobile device;

retrieving, from the mobile device, a subscriber identity associated with a subscriber module of the mobile device;

accessing a server located in the cellular data network to determine a network address identifier associated with the mobile device, using the retrieved subscriber identity;

associating the determined network address identifier with the mobile device including storing a mapping containing:
the identifier associated with the wireless network adapter of the mobile device,
the network address identifier associated with the mobile device connected to the cellular data network, and
the subscriber identity associated with the subscriber module of the mobile device;

determining first network operation parameters of the wireless local area data network;

determining second network operation parameters of the cellular network interface of the mobile device;

selecting one of the wireless local area network interface or the cellular network interface in accordance with the determined first and second network operation parameters; and causing the mobile device to use the selected one of the wireless local area network interface or the cellular network interface for any existing and new data sessions and redirecting data sessions based on the identifiers of the mobile device, wherein, in response to processing of the wireless access point device, the mobile device is operable to use the selected one of the wireless local area network interface or the cellular network interface and disconnect from the non-selected one of the wireless local area network interface or the cellular network interface.

2. The method according to claim 1, wherein the network address identifier includes a Medium Access Control address and an Internet Protocol address of the mobile device on a wireless local area data network.

3. The method according to claim 1, wherein the network address identifier includes a tracking area identifier and a cell-id identifier for the mobile device on a cellular data network.

4. A non-transitory computer-readable storage medium storing a computer program element comprising computer program code to, when loaded into a computer system and executed thereon, cause the computer to perform the method as claimed in claim 1.

5. A data network system for selecting a data communication interface to be used by a mobile device having at least a wireless local area network interface connected to a wireless local area data network and a cellular network interface connected to a cellular data network, the system comprising:
- a wireless access point device configured to send and to receive data packets to and from the wireless local area network interface and the cellular network interface of the mobile device and for communicating the data packets on to a plurality of wide area networks, comprising:
  - a wireless local area network interface;
  - a mobile device identity information store;
  - a processor for:
    - determining, from the mobile device, an identifier associated with a local wireless network adaptor of the mobile device,
    - retrieving a subscriber identity associated with a subscriber module of the mobile device,
    - accessing a server located in the cellular data network to determine a network address identifier associated with the mobile device, using the retrieved subscriber identity,
    - associating the determined network address identifier with the mobile device including storing in a data store a mapping containing:
      - the identifier associated with the local wireless network adapter of the mobile device,
      - the network address identifier associated with the mobile device connected to the cellular data network, and
      - the subscriber identity associated with the subscriber module of the mobile device,
    - determining first network operation parameters of the wireless local area data network, and
  - means for determining second network operation parameters of the cellular network interface of the mobile device; and
  - a controller for selecting one of the wireless local area network interface or the cellular network interface in accordance with the determined first and second network operation parameters and for causing the mobile device to use the selected one of the wireless local area network interface or the cellular network interface for any existing and new data sessions and redirecting data sessions based on the identifiers of the mobile device,
  - wherein in response, the mobile device is operable to use the selected one of the wireless local area network interface or the cellular network interface and disconnect from the non-selected one of the wireless local area network interface or the cellular network interface.

6. The system according to claim 5, wherein the network address identifier includes a Medium Access Control address and an Internet Protocol address of the mobile device on a WiFi wireless data network.

7. The system accord to claim 5, wherein the network address identifier includes a tracking area identifier and a cell-id identifier for the mobile device on a cellular network.

* * * * *